United States Patent [19]

Tsenter

[11] Patent Number: 5,569,554
[45] Date of Patent: Oct. 29, 1996

[54] SEALED RECHARGEABLE BATTERY WITH STABILIZER

[75] Inventor: Boris Tsenter, Jerusalem, Israel

[73] Assignee: Acme Electric Corporation, East Aurora, N.Y.

[21] Appl. No.: 306,633

[22] Filed: Sep. 15, 1994

[51] Int. Cl.[6] .................... H01M 10/36; H01M 10/50; H01M 10/52

[52] U.S. Cl. .................... 429/57; 429/7; 429/9; 429/59; 429/61; 429/62

[58] Field of Search .................... 429/7, 9, 57, 59, 429/61, 62

[56] References Cited

U.S. PATENT DOCUMENTS

| | | |
|---|---|---|
| 1,016,874 | 2/1912 | Edison . |
| 2,104,973 | 1/1938 | Dassler . |
| 3,080,440 | 3/1963 | Ruetschi et al. . |
| 3,096,215 | 7/1963 | Voss et al. . |
| 3,305,404 | 2/1967 | Sundberg . |
| 3,410,725 | 11/1968 | Harivel . |
| 3,424,617 | 1/1969 | Grieger et al. . |
| 3,470,025 | 9/1969 | Yehiely . |
| 3,598,653 | 8/1971 | Fukuda et al. . |
| 3,622,397 | 11/1971 | Belove . |
| 3,622,398 | 11/1971 | Sekido et al. . |
| 3,630,778 | 12/1971 | Kreidl et al. . |
| 3,701,691 | 10/1972 | Sassmannshausen et al. . |
| 3,763,416 | 10/1973 | Jache .......................... 320/35 |
| 3,817,717 | 6/1974 | Kreidl et al. . |
| 3,977,906 | 8/1976 | Beatty et al. . |
| 3,990,910 | 11/1976 | Giner et al. . |
| 4,113,924 | 9/1978 | Kantner . |
| 4,143,212 | 3/1979 | Ueno et al. . |
| 4,216,274 | 8/1980 | Bruning et al. . |
| 4,224,384 | 9/1980 | Kozawa et al. . |
| 4,275,127 | 6/1981 | Ritterman et al. .................... 429/50 |
| 4,346,151 | 8/1982 | Uba et al. . |
| 4,383,011 | 5/1983 | McClelland et al. . |
| 4,407,911 | 10/1983 | Hooke . |
| 4,434,214 | 2/1984 | Suzuki . |
| 4,689,544 | 8/1987 | Stadnick et al. . |
| 4,696,873 | 9/1987 | Yagasaki et al. . |
| 4,728,586 | 3/1988 | Venkatesan et al. . |
| 4,769,299 | 9/1988 | Nelson . |
| 4,898,794 | 2/1990 | Doi et al. . |
| 4,900,642 | 2/1990 | Tomantschger et al. . |
| 4,925,746 | 5/1990 | Pavlov et al. . |
| 4,925,747 | 5/1990 | Kordesch et al. . |
| 4,983,474 | 1/1991 | Doi et al. . |
| 5,034,289 | 7/1991 | Yuasa et al. . |
| 5,043,233 | 8/1991 | Kameoka et al. . |
| 5,043,234 | 8/1991 | Tomantschger et al. . |
| 5,082,754 | 1/1992 | Jones . |
| 5,096,667 | 3/1992 | Fetcenko . |
| 5,104,617 | 4/1992 | Fetcenko et al. . |
| 5,106,707 | 4/1992 | Catotti et al. . |
| 5,128,219 | 7/1992 | Kohler et al. . |
| 5,131,920 | 7/1992 | Moriwaki et al. . |
| 5,143,799 | 9/1992 | Tsenter . |
| 5,162,169 | 11/1992 | Tomantschger et al. . |
| 5,166,596 | 11/1992 | Goedken . |
| 5,290,640 | 3/1994 | Tsenter et al. . |

OTHER PUBLICATIONS

Sammarco, John J. "Intrinsically Safe 5-V, 4-A Rechargeable Power Supply." *Bureau of Mines Information Circular,* 1989 (Month unknown).

Primary Examiner—Prince Willis, Jr.
Assistant Examiner—Richard H. Lilley, Jr.
Attorney, Agent, or Firm—Pearne, Gordon, McCoy & Granger

[57] ABSTRACT

A voltage regulator for a sealed rechargeable storage battery containing one or more rechargeable working cells and at least one regulator cell. The regulator cells are capable of consuming gas in a gas space within the sealed battery during charging of the working cells. The regulator cell is in gaseous communication with the gas space, and having a voltage stabilizer maintaining a preselected voltage range to the regulator cell and maintain a current to the regulator cell depending on the gas to be consumed.

30 Claims, 4 Drawing Sheets

SEALED RECHARGEABLE BATTERY WITH STABILIZER

BACKGROUND OF THE INVENTION

This invention relates generally to sealed rechargeable batteries and more particularly to a control logic for sealed rechargeable batteries wherein the voltage applied to a regulator cell is maintained within a preselected range.

DESCRIPTION OF THE RELATED ART

Rechargeable battery cells with solid electrodes are of two general types: (1) open or vented, sometimes referred to as "flooded"; and (2) sealed, commonly referred to as "starved". Generally, in a flooded cell, the electrodes are immersed in electrolyte, while in a starved cell, the electrodes are not immersed in electrolyte. These two types of batteries differ primarily in the way in which they deal with gases, namely oxygen and/or hydrogen, which are generated in the battery cells toward the end of the charging operation and during overcharging.

Type 1 allows the gases to vent to the atmosphere; in Type 2, the gases (primarily oxygen) are recombined back into water inside the sealed battery cell. Type 2 is preferred from the user's point of view because the sealed cell requires no periodic maintenance, maintains charge balance between the plates, can operate in any position, releases no explosive gases and does not leak corrosive chemicals into the environment.

Two different kinds of sealed cells (Type 2) are known in the industry. One is a standard design common in consumer cylindrical and small prismatic or rectangular cells up to about 50 Ah capacity for Ni—Cd, and about 500 Ah for Pb-Acid. The other (which has been commercialized for Ni—Cd batteries only) employs recombination plates and uses a split negative plate and is available in up to about 100 Ah capacity. Although different in construction and performance, both of these sealed cells share some fundamental principles, as follows.

1. They attempt to minimize hydrogen evolution by using an excess of discharged negative material and rely on the oxygen cycle to maintain discharged negative material in the cell at all times.
2. They are limited to individual vessel designs, that is, individual cells each hermetically sealed to ensure that all oxygen generated in a particular cell will recombine in the same cell (with some exception for monoblock Pb-Acid that sometimes use common gas space).
3. They use starved electrolyte in the stack of electrodes and separators to permit oxygen transport to the negative electrode. This dictates tight stacking of electrodes, small interelectrode distance and close control of the electrolyte level in the cell.
4. If placed in a multiple cell battery, they require close matching of cell capacities, charge efficiencies and temperatures to guarantee long life and avoid cell reversal, hydrogen evolution, overpressure and overheating.

Vented cells, on the other hand, are more robust, are less sensitive to overcharge and overdischarge or deep discharge. There is also less concern with cell temperature and pressure. They are generally less expensive to build and more applicable to large cells as well as large batteries, yet they pose considerable difficulties to the user who is concerned with periodic maintenance, explosive gas releases into the environment, electrolyte splashing, and loss of plate balance in the cells.

U.S. Pat. No. 5,143,799, which is hereby incorporated in its entirety by reference herein, tried to address some of these problems. This patent disclosed a sealed rechargeable nickel zinc or silver zinc cell which was divided into two compartments, one having a zinc electrode and a first hydrogen electrode and a second having a nickel or silver electrode and a second hydrogen electrode electrically connected to the first hydrogen electrode. A common gas space was provided for the two compartments so that the hydrogen and oxygen gases could recombine to water and the container could be sealed. Among other expensive features, this battery requires a hydrogen electrode in each cell, which is very costly, and the cells need to be starved.

Another prior U.S. Patent which tried to address the problems mentioned above was U.S. Pat. No. 5,290,640, which is hereby incorporated in its entirety by reference herein. This patent disclosed a sealed rechargeable storage battery containing one or more rechargeable working cells which are capable of generating gas in a gas space within the sealed battery during charging of the rechargeable working cells. It comprised a sealed container filled or charged with hydrogen, at least one rechargeable cell inside the container, a pressure sensor mounted to detect pressure inside the sealed container, a common gas space inside the container for at least one rechargeable cell and pressure regulator, a minimum of three terminals extending (in a sealed manner) through the container, and a connected, rechargeable cell and regulator (monoblock design). The monoblock version described in U.S. Pat. No. 5,290,640 gives a unique opportunity to produce a sealed battery with flooded water electrolyte.

However, U.S. Pat. No. 5,290,640 suffers from the following shortcomings:

1. It does not take into consideration the specifics of the chemistry at the respective electrodes;
2. The discharge regulators associated with cathodic polarization of the hydrogen electrode can result in plating of metallic cadmium onto a hydrogen electrode in nickel-cadmium batteries. The plating of cadmium on the hydrogen electrode is known to cause poisoning of the activity of the hydrogen electrode;
3. It relates primarily to large batteries because it requires internal monitoring devices to determine the charge status of the battery;
4. It is necessary to have a sensor to regulate the pressure value. The installation of the pressure sensor may be necessary for a large battery, but does not create problems for a large battery. However, a pressure sensor can be a problem for a small battery due to the limited space available. The term "small battery" may refer to a battery with less than 100 watt-hours/liter. (i.e. a size of less than 1 liter. Alternatively, a small battery can be considered to be a battery having insufficient size to readily accommodate an internal pressure sensor capable of sensing the internal pressure of the battery.
5. The cost of the pressure sensor and/or internal temperature sensor can result in a large impact on the total price for small batteries;

SUMMARY OF THE INVENTION

The invention is directed to a voltage regulator to be used with a sealed rechargeable storage battery which provides a control logic that overcomes the disadvantages presented in the related art. The battery contains one or more rechargeable working cells which are capable of consuming gas in a gas space within the sealed battery during charging of the rechargeable working cells, the sealed rechargeable battery has at least one regulator cell provided within the battery which is in gaseous communication with the gas space. The regulator cell is chargeable and dischargeable depending on the kind of gas that is being consumed. The control circuit is preferably external to said battery and is maintained within a given voltage range. The regulator voltage is maintained within a preselected range to permit consumption of hydrogen, oxygen, or both gases. The voltage values given herein are a per cell value unless otherwise indicated. Within the preselected range there is rapid consumption of the gases produced, therefore there is an acceleration of the exchange of $H_2$, $O_2$, and $H_2O$ vapor between the working cells and the regulator cell. The voltage regulator may serve as a pressure regulator by consuming the gases produced during the charge or discharge of the battery.

The invention is further directed towards a rechargeable sealed battery of common vessel construction having a control logic wherein the voltage regulator or voltage stabilizer maintains the regulator voltage within the regulator cell within a preselected range that is dependent on the Open Circuit Voltage ("OCV"). Such a battery may have a nickel oxide, silver oxide, manganese dioxide, or lead dioxide positive electrode as well as a cadmium, iron, metal hydride, zinc or lead negative electrode. The most commonly used are rechargeable alkaline batteries with solid electrodes, such as, nickel oxide positive electrode in combination with cadmium negative electrodes. This combination is known by the common name Ni—Cd battery, often pronounced Nicad. A detailed description of this type of battery and equivalent batteries can be found in U.S. Pat. No. 5,290,640 which is incorporated herein in its entirety.

The invention may comprise a common vessel sealed rechargeable battery which comprises in combination a sealed housing, a plurality of a first type of cells within the sealed housing, means for connecting all cells in series or in parallel, positive and negative terminals connected through a wall of the sealed housing to positive and negative ends of the series connected cells, one or more cells of a second type, connected in parallel or in series with each other, within said sealed compartment and having a common gas space with cells of said first type, at least one metal electrode and at least one hydrogen electrode in said second cell type, a hydrogen terminal connected through a wall of the sealed housing to the hydrogen electrodes in said second cell type, and means to make external connection to said negative electrode of said second cell type, the external connection being to a voltage regulator which maintains the voltage of the second cell type within a given range. The range has a maximum voltage, $V_{max}$, a minimum voltage, $V_{min}$, and an open circuit voltage. The voltage value is determined based on the number of regulator cells and whether they are parallel, in series or a combination of these two.

The invention may further be summarized as a rechargeable battery comprising in combination, a sealed container having a wall, a plurality of working cells in said container, negative and positive electrodes in each of said working cells, means connecting cells of said working cells in series or parallel between positive and negative terminals extending through a container wall for external connection to said series connected cells, one or more regulator cells in said sealed container, a common gas space for all said cells in said sealed container, hydrogen electrodes and metal, metal hydride, or metal oxide electrodes in said regulator cell, and means providing external connection to said electrodes in said regulator cell. At least one of said external connections is to a voltage regulator that maintains the voltage applied to the regulator cell within a desired range. The regulator cell will feature either a Cd, Fe, Zn, Metal Hydride (MeH), Pb or NiOOH, MnOOH and $PbO_2$ electrode against a hydrogen electrode. The working cells could be of flooded or vented design. Additionally there may be an external means to monitor pressure such as a thin temperature wire which is commonly known in the art. The regulator voltage per cell, $V_R$, should be maintained within a preselected range. If a metal-hydrogen or metal hydride-hydrogen regulator cell is used then the voltage per cell should most preferably be maintained within the following range:

$$V_{OC}+0.05 \text{ V}<V_R<V_{OC}+0.70 \text{ V}$$

If a metal-hydrogen or metal hydride-hydrogen regulator cell is used then the polarity of the hydrogen electrode is positive and the polarity of the metal or metal hydride electrode is negative.

If a metal oxide-hydrogen regulator is used then the voltage per cell should most preferably be maintained within the following range:

$$V_{OC}-0.70 \text{ V}<V_R<V_{OC}-0.05 \text{ V}$$

If a metal oxide-hydrogen regulator is used then the polarity of the hydrogen electrode is negative and the polarity of the metal oxide electrode is positive.

An object of the invention, therefor, is to provide a rechargeable sealed battery which has the advantages of a vented battery and of a sealed battery and has a control logic which permits the consumption of any gas without monitoring the type of gas produced. It is possible in small batteries to eliminate the need for an internal pressure sensor. Thus the logic of the present invention can be used in batteries having a size less than 100 watt-hours/liter. (i.e a size of less than 1 liter.

Another object of the invention is to allow external monitoring of the state of the battery based on the external temperature of the battery.

Another object of the invention is to determine the efficiency of the charge based on the value of the current in the regulator cell.

Another object of the invention is to allow smaller batteries to be produced as a result of the possibility of elimination of the internal pressure sensor.

Another object of the invention is to provide a rechargeable battery which may be sealed as distinct from having to seal individual cells.

Another object of this invention is to take into account the chemistry at the regulator cell and to establish a maximum and minimum voltage per cell which should be applied to the regulator.

Another object of the invention is to provide a sealed rechargeable battery which includes a rechargeable regulator wherein discharging the regulator consumes oxygen; charging the regulator consumes hydrogen, and in open circuit conditions, stoichiometric amounts of hydrogen and oxygen are consumed. This gives the unique possibility of operating a sealed battery with individual cells that are of vented design with the capability of dealing with both oxygen and hydrogen evolution.

Another object of the invention is to provide a control logic for the voltage regulator of the regulator cell whereby the voltage applied to the regulator cell is maintained within a preselected range that permits consumption of hydrogen, oxygen, or both gases.

Another object of the invention is to provide rapid consumption of hydrogen, oxygen, or both gases produced in order to accelerate the exchange of $H_2$, $O_2$, and $H_2O$ vapor between the working cells and the regulator cell.

Another object of the invention is to prevent poisoning of the hydrogen electrode with cathodic deposition of metal by supporting the hydrogen electrode under positive polarity and the metal electrode under negative polarity regardless of which type of gas is consumed. The positive polarity prevents cathodic deposition of the metal.

Other objections and a fuller understanding of the invention may be had by referring to the following description and claims, taken in conjunction with the accompanying drawings.

DETAILED DESCRIPTION OF THE PREFERRED EMBODIMENTS

Figure 1:
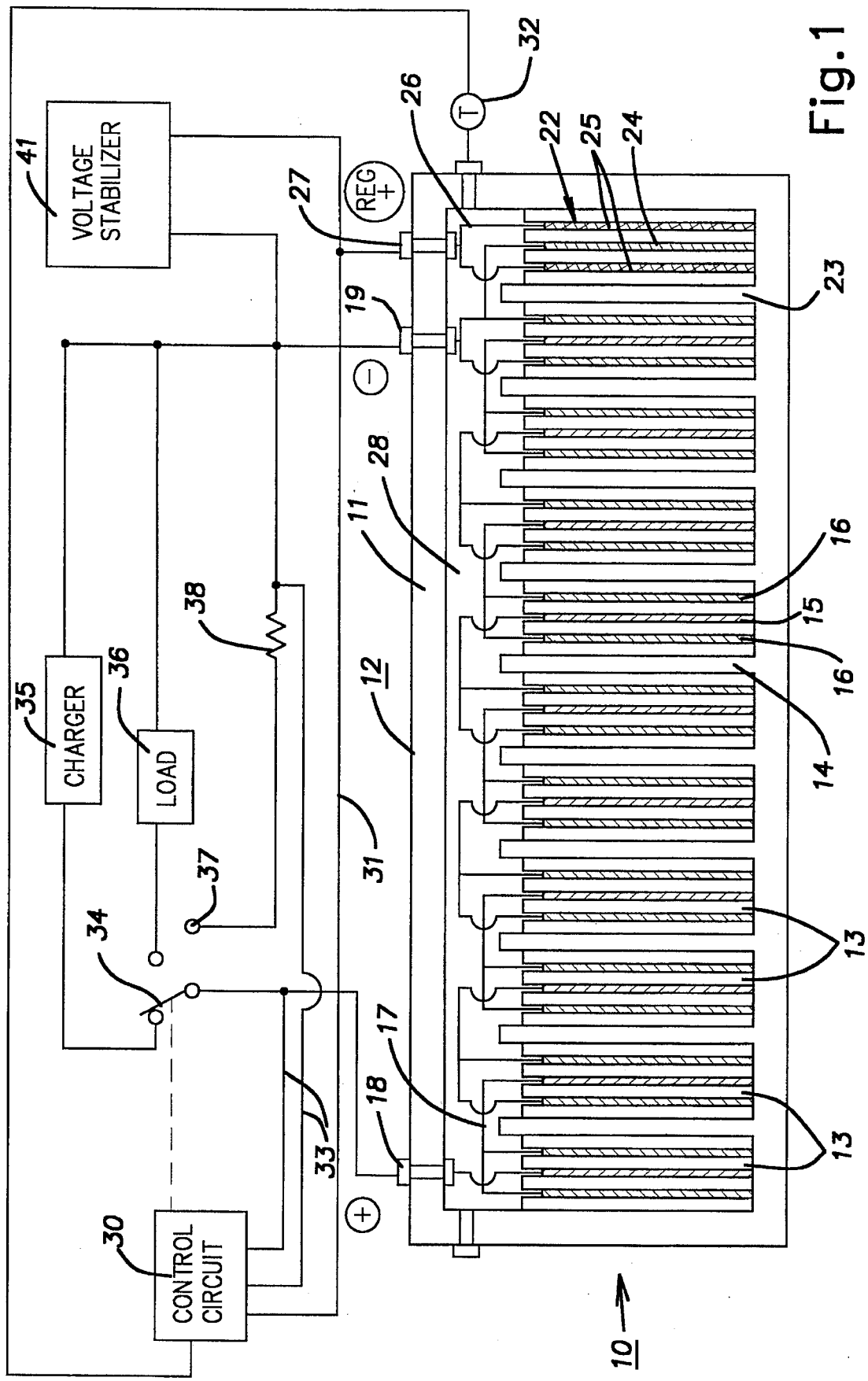
FIG. 1 illustrates a sealed rechargeable battery according to the invention.

FIG. 1 shows diagrammatically a sealed rechargeable battery 10 which has a wall 11 forming a hermetically sealed container or caselike housing 12. At least one rechargeable working cell 13 is provided in the battery. Usually the battery will contain a plurality of such cells 13 and in this case ten of such cells 13 have been shown. Fluid impermeable barriers 14 separate each of the cells, and each cell includes at least one positive electrode 15 and at least one negative electrode 16. In the illustrated battery, two negative electrodes 16 are shown with a single positive electrode 15 for each cell. The invention will be described in terms of Ni—Cd cells and a Cd—$H_2$ regulator, but it will be noted that in principle it is possible to use in conjunction with a working Ni—Cd battery (Ni—Fe, Ni—Zn, Ag—Zn, Pb—$PbO_2$, Ni—MHx, etc.) several types of M—$H_2$ regulator cells, where M represents any stable reversible metal electrode such as Cd, Zn, Fe, Pb, or metal hydride (MeH), or metal oxide such as NiOOH, MnOOH, $PbO_2$ etc.. The metal hydrides contain metal alloys which are able to absorb and desorb hydrogen reversibly. The metal alloys used have $AB_2$ or $AB_5$ structure, where A is a mish metal constituted by 22–26% La, 48–55% Ce, 15–20% Nd, and 4–7% Pr, and B is a combination of Ni, Co, Mn, Al, V, Zr, and Ti.

The working cells 13 are a string of several vented, slightly flooded, Ni—Cd cells which are connected in series or in parallel by conductors 17 with one end of the series being connected in a sealed manner through the wall of the container 12 to an external positive terminal 18. The other end of the series is connected through the wall of the container 12 to an external negative terminal 19.

A regulator for the working cells is provided inside the container 12 in accordance with the present invention. This regulator is capable of consuming hydrogen and consuming oxygen without generating hydrogen and in this preferred embodiment is a regulator or auxiliary cell 22. It is within the container 12 but it is electrochemically separated from the working cells by a fluid impermeable barrier 23. The regulator cell 22 includes at least one metal, metal hydride (MeH), or metal-oxide electrode 24 and at least one hydrogen electrode 25. The hydrogen electrodes 25 may be connected by a conductor 26 to pass through the wall of the container 12 to an external hydrogen terminal 27. The terminal 27 is termed a "hydrogen" terminal because a principle function of the regulator cell 22 is to consume hydrogen and oxygen in order to effect a balance with the working cells 13. The regulator cell 22 and the working cells 13 share a common gas space 28 so that hydrogen and oxygen are free to intermingle and combine. Alternatively, each cell could have an individual gas space above it, with all these gas spaces in gaseous communication with each other. The hydrogen electrode 25 is a catalytic electrode known in the art from fuel cells or nickel-hydrogen cells. This electrode must have good activity to hydrogen, must operate at low pressures, and must be stable in an alkaline electrolyte. The preferred alkaline electrolyte will feature potassium hydroxide with possibly some lithium hydroxide and/or sodium hydroxide as well known in the art. The electrolyte in the working cells could be different from the electrolyte in the regulator, but the total electrolyte activity of the two electrolytes should preferably be the same since all cells are under common vapor pressure. The regulator cell is "starved", with only enough electrolyte to wet the plates and separators to guarantee effective gas diffusion to the hydrogen electrode.

In FIG. 1, a control circuit 30 is shown having input from an external temperature probe 32 (optional), preferably at the location of the regulator cell 22, and a voltage input via conductors 33 across the terminals 18 and 19. These inputs to the control circuit control the output, such that the control circuit controls a selector switch 34 which may be used to select a charger 35, a load 36 or, in effect, an open circuit 37 condition for the working cells of the battery the control circuit may utilize an external load such as high resistance 38. The control circuit may also have a voltage input via conductor 31 at terminal 27 to serve as a current controller. The voltage regulator or voltage stabilizer 41 maintains the voltage applied to the regulator cell 22 within a preselected range depending on the $V_{OC}$ and may also change the direction of the current and maintain the polarity of the respective electrodes in the regulator cell. For example, if a metal-hydrogen or metal hydride-hydrogen regulator cell is used then the voltage per regulator cell should be maintained within the following ranges:

preferably $V_{OC}+0.05\ V<V_R<V_{OC}+1.0\ V$;

more preferably $V_{OC}+0.05\ V<V_R<V_{OC}+0.80\ V$;

even more preferably $V_{OC}+0.05\ V<V_R<V_{OC}+0.70\ V$;

and more preferably $V_{OC}+0.20\ V<V_R<V_{OC}+0.50\ V$.

If a metal oxide-hydrogen regulator is used then the voltage per cell should be maintained within the following ranges:

preferably $$V_{OC}-0.90\ V<V_R<V_{OC}-0.05\ V;$$

more preferably $$V_{OC}-0.80V<V_R<V_{OC}-0.05\ V;$$

even more preferably $$V_{OC}-0.70\ V<V_R<V_{OC}-0.05\ V.$$

and more preferably $$V_{OC}-0.40\ V<V_R<V_{OC}-0.20\ V.$$

When a metal oxide-hydrogen regulator is used then the polarity of the hydrogen electrode is negative and the polarity of the metal oxide electrode is positive. Therefore if $Cd$—$H_2$ couple is used as the regulator cell the more preferable maximum voltage should be 0.70 V and the more preferable minimum voltage should be 0.05 V since the Open Circuit Voltage is 0.00 V. The voltage stabilizer 41 not only maintains the voltage within a preselected magnitude, but also maintains the direction of the current. For example, if a $Cd$—$H_2$ couple 13 is used the $H_2$ electrode is always maintained at a positive polarity and current direction depends on the gas consumed.

The regulator cell 22 should contain enough cadmium capacity to serve as an overcharge reserve for the full battery. For example, if the battery is constructed with ten Ni—Cd cells in series at 100 Ah each and one regulator cell, and if one wishes to allow for a cumulative 10% of total positive electrode capacity, the metallic Cd capacity of the auxiliary cell should be at least: 100×10×10%=100 Ah.

The sealed container 12 may have a fourth terminal connected to the metal, metal hydride, or metal oxide electrode of the regulator. However, for better economy, the negative terminal of the battery and of the regulator cell may be common as shown in FIG. 1. The sealed container may also have a pressure transducer to provide input to the control circuit as is described in U.S. Pat. No. 5,290,640.

Figure 2:
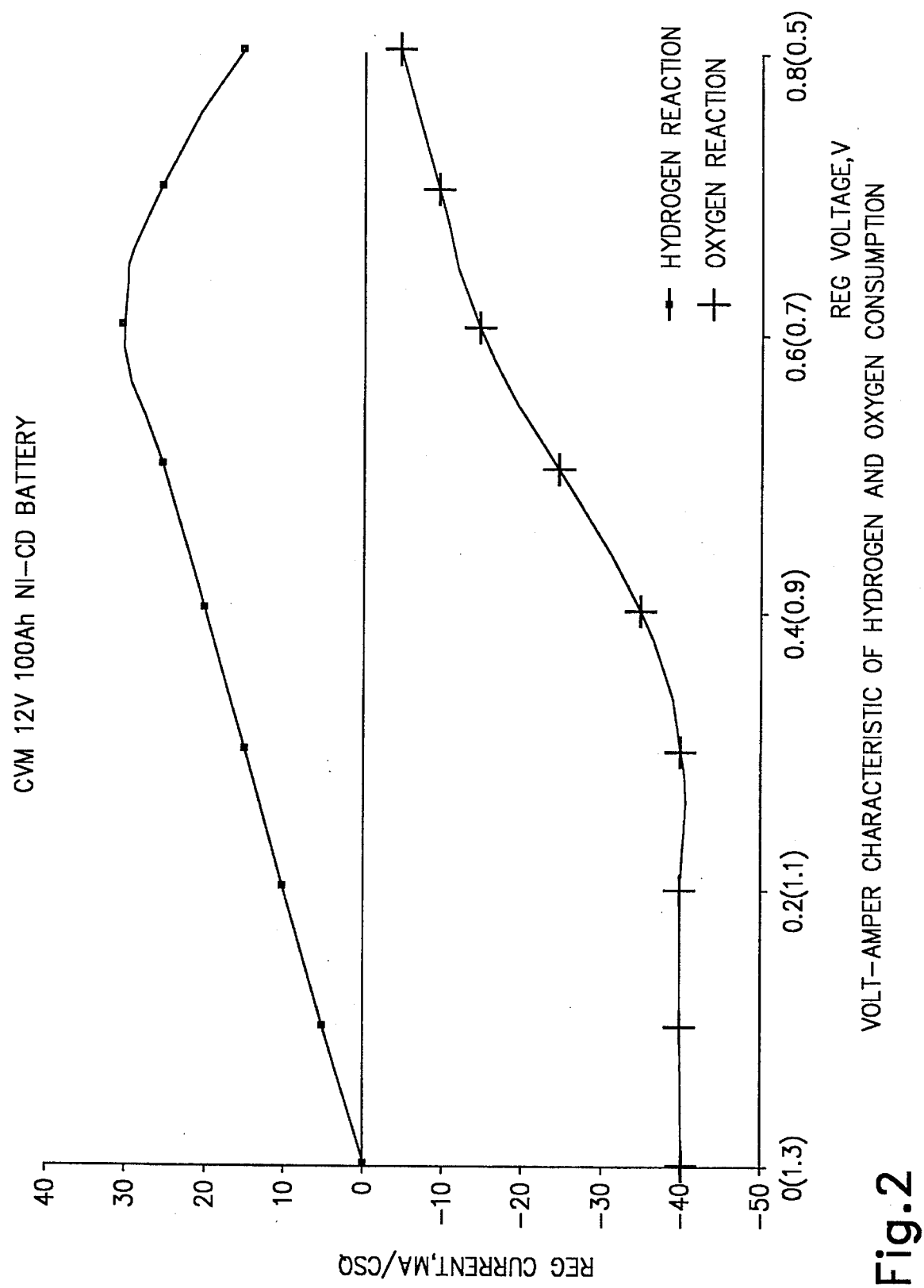
FIG. 2 is a graph which shows the rates of hydrogen and oxygen consumption versus the regulator voltage if $Cd$—$H_2$ or $NiOOH$—$H_2$ couple are used.

FIG. 2 shows the rates of hydrogen and oxygen consumption versus regulator voltage if a $Cd$—$H_2$ or $NiOOH$—$H_2$ couple is used. The horizontal axis gives the magnitude of the voltage applied to the regulator cell with the value for $Cd$—$H_2$ given outside the parenthesis and the magnitude for $NiOOH$—$H_2$ coupling is given inside the parenthesis. The rate of hydrogen consumption is too small at low voltages and rate of oxygen consumption is too small at high voltages (i.e. greater than 0.70 V for $Cd$—$H_2$). This relationship occurs with metal or metal hydride-hydrogen couple and vice versa for metal-oxide-hydrogen couple according to FIG. 2.

The voltage stabilizer or voltage regulator 41 maintains a constant or preselected voltage range within the regulator cell 22, the magnitude of the voltage being determined by the type of regulator couple used. The direction of the current and resultant consumption of hydrogen for a $Cd$—$H_2$ couple is opposite to the direction and resultant consumption of hydrogen for a NiOOH couple. Therefore the preselected range will be dependent on whether a metal-hydrogen couple ($Cd$—$H_2$) or a metal oxide-hydrogen couple is used ($NiOOH$—$H_2$).

Figure 3:
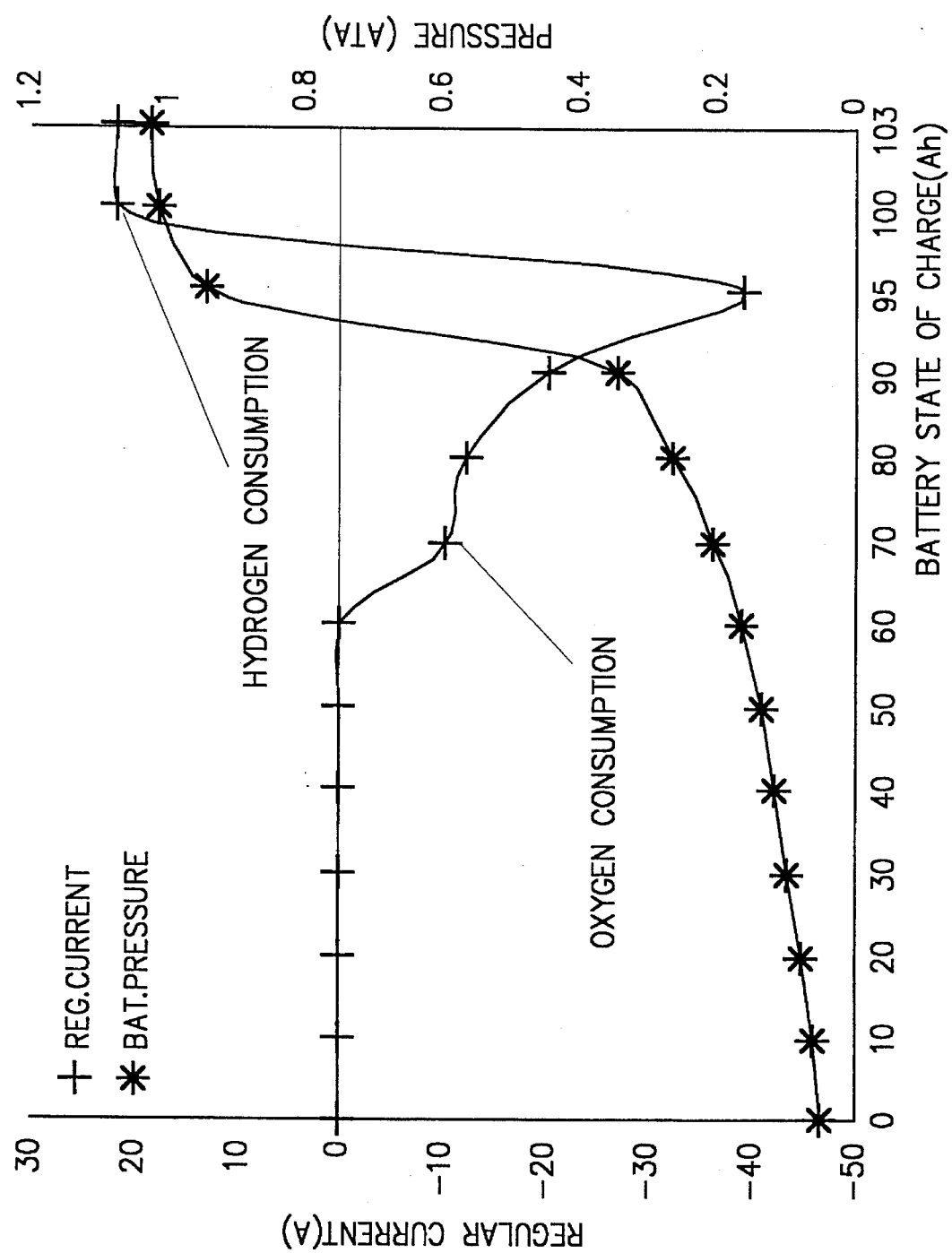
FIG. 3 illustrates the pressure and regulator current changes occurring in the process of charging a 10 cell 100 Ah common vessel monoblock.

FIG. 3 illustrates the pressure and regulator current changes occurring in the process of charging a 10 cell 100 Ah common vessel monoblock battery of the current invention. Oxygen evolution from battery cells occurs first. This oxygen is consumed in the regulator at maximum current 32A (via reaction 3). The battery (Ni—Cd, for example) will be charged above the nickel capacity for some evolution of oxygen gas. Since the charge efficiency of the cadmium electrode is better than that of the nickel-oxide electrode, oxygen is consumed in the regulator as per the following reaction if a $Cd$—$H_2$ regulator is used.

At the hydrogen electrode:

$$½\ O_2+H_2O=-2e+2OH— \qquad (1)$$

At the cadmium electrode:

$$Cd+2OH^--2e=Cd(OH)_2 \qquad (2)$$

Summary reaction:

$$Cd+½\ O_2+H_2O=Cd(OH)_2 \qquad (3)$$

Since the OCV of the $Cd$—$O_2$ couple is 1.20 V we have 0.5 V<η<1.15 V overvoltage for the oxygen consumption as per reaction (3). There was a maintenance of 0.4 V at the $Cd$—$H_2$ regulator in the experimental 12 V 100 Ah battery. The overvoltage is 1.20-0.4=0.80 V to consume oxygen. The cadmium electrode is negative and the hydrogen electrode is positive. The active $Cd$—$O_2$ couple produce energy equal to the product of the regulator's voltage and current. Reaction (3) is exothermic and results in the regulator's temperature rise which can be used as an indicator of the state of charge of the battery. For example, an increase in temperature of 5-10 degrees Celsius over the normal operating temperature of the battery may serve as an indicator to terminate the charging of the battery. Thus a means for sensing the temperature of the can be used to control the charging and discharging process. The voltage at the regulator is maintained equal to 0.40 V per cell. Moreover, the hydrogen electrode has positive polarity and the cadmium electrode has negative polarity.

As stated above, reaction (3) permits the temperature of the battery to indicate the status of the battery's charge. Therefore it is possible to use an external temperature probe such as temperature probe 32 to monitor the temperature of the battery to ascertain the charge status of the battery. One type of temperature probe which may be used is a Temperature Sensor LM35C sold by the National Semiconductor Corporation.

Figure 4:
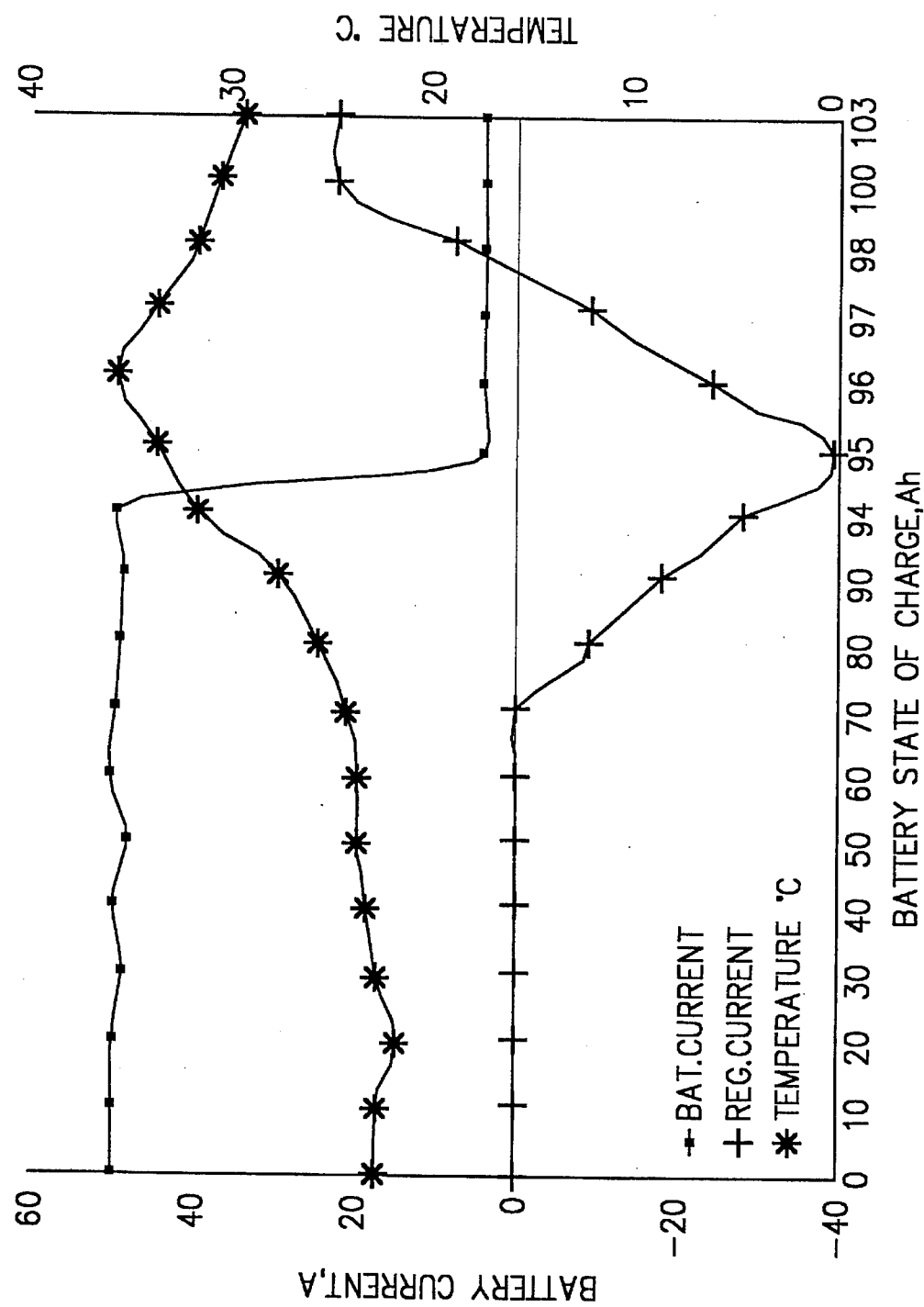
FIG. 4 is a graph which shows the temperature dependence versus the state of charge of the battery and the regulator cell.

The use of an external temperature probe or even an internal temperature sensor as the size of the battery increases to ascertain the charge status of the battery can be used in combination with the present logic. Normally one would see uneven current distribution throughout the working cells connected in parallel due to the exothermic reactions occurring throughout the battery, however in the present invention the consumption of the gases produced during the charge-discharge process are consumed at the regulator cell 22. If a parallel series connection is used, it is very unlikely that the uneven current distribution seen in the prior art would be seen in the present invention, and the increase in temperature would occur mainly at the regulator cell. Since the temperature change would occur mainly at the regulator cell 22 the most preferred position of the temperature sensor would be in close proximity to the regulator cell. FIG. 4 demonstrates that as the charge of the battery approaches 100 Ah the temperature of the regulator cell increases anywhere from about 2-20 degrees Celsius due to the exothermic reactions inside the regulator cell and this can be used as a signal of charge status of the battery.

Hydrogen is produced from the working cells after the battery's state of charge is equal to approximately 95% and is then consumed at the regulator cell as per reaction (6). The hydrogen produced at the cadmium electrode of the working cells during overcharge is consumed at regulator cell per reactions:

At hydrogen electrode:

$$H_2+2OH^--2e=2H_2O \qquad (4)$$

At cadmium electrode:

$$Cd(OH)_2+2e=Cd+2OH^- \qquad (5)$$

Summary reaction $$Cd(OH)_2+H_2 \rightarrow Cd+2H_2O \qquad (6)$$

As per reaction (6), hydrogen is consumed under the same voltage of the regulator cell equal to $V_{OC}+0.05$ V$<V_R<V_{OC}+0.70$ V. The current direction is reversed if hydrogen is consumed as opposed to oxygen being consumed. Thus the direction of the current also permits the status of the charge to be obtained without the expensive and intrusive pressure monitoring systems mentioned above. There is a passive Cd—$H_2$ couple which consumes the energy from the charger equal to the product of the regulator voltage and current. The hydrogen electrode polarity is positive and the cadmium electrode has negative polarity in the case of oxygen consumption. The positive polarity of the hydrogen electrode eliminates the electrochemical deposition of metallic cadmium which is poisonous to the hydrogen electrode. The value of the current for reactions (3) and (6) indicates the efficiency of the charge process because hydrogen and oxygen are produced during parasitic process and the production of hydrogen and oxygen can also be used as a signal for the charge termination or to change the battery current. Per reaction (6), the regulator cell's current changes direction but the voltage is maintained and has the same polarity.

Part of the hydrogen oxygen mixture is consumed chemically as per reaction (7), because the pressure drops if the regulator is switched off. Reaction (7), in addition to reaction (3, 6) will spontaneously occur at the hydrogen electrode:

$$H_2+\tfrac{1}{2} O_2=H_2O \qquad (7)$$

If only reaction (7) occurs in the regulator cell, this means that both electrodes of the working cells have a full charge and the regulator ratio will not change. The regulator can be supported at the same voltage $V_{OC}+0.05$ V$<V_R<V_{OC}+0.70$ V for the consumption of any gas, which can be produced during the storage of the battery. Reaction (7) will spontaneously occur at the hydrogen electrode if the gas phase contains both hydrogen and oxygen.

The following reactions occur if a NiOOH—$H_2$ regulator is used for the consumption of oxygen:

At the hydrogen electrode $$\tfrac{1}{2} O_2+H_2O=-2e+2OH^- \qquad (8)$$

At the nickel-oxide electrode $$2Ni(OH)_2+2OH^--2e=2NiOOH+2H_2O \qquad (9)$$

Summary reaction $$2Ni(OH)_2+\tfrac{1}{2} O_2=2NiOOH+H_2O \qquad (10)$$

Since the OCV of the NiOOH—$H_2$ couple is 1.30 V the voltage at the regulator is equal to 0.60 V$<V_R<$1.25 V for the oxygen consumption as per reaction (10).

If voltage equal to 0.9 V is maintained at the NiOOH—$H_2$ regulator this means that overvoltage for reaction (10) is equal to 0.9–0.10=0.80 V. The charger energy consumed is equal to the product of the regulator's voltage and the regulator's current. Hydrogen produced at the Cd electrode of working cells during overcharge is consumed at the regulator as per the following reactions:

At the hydrogen electrode:

$$H_2+2OH^--2e=2H_2O \qquad (11)$$

At the nickel-oxide electrode:

$$2NiOOH+2H_2O+2e=2Ni(OH)_2+2OH^- \qquad (12)$$

Summary reaction:

$$2NiOOH+H_2=2Ni(OH)_2 \qquad (13)$$

The summary reaction (13) is the same reaction which occurs during the discharge of the nickel-hydrogen cell and the regulator's voltage for this reaction is 0.6 V$<V_R<$1.25 V.

The active NiOOH—$H_2$ couple produces energy equal to the product of the regulator's voltage and the regulator's current. The hydrogen electrode polarity is negative and the nickel-oxide electrode has a positive polarity, as in the case of oxygen consumption by means of a NiOOH—$H_2$ regulator. As stated above, the value of the current for reactions (3, 6) and (10, 13) indicates the efficiency of the charge process and can be used as a signal for charge termination.

After a full charge, the regulator can be supported at the same voltage as at charge for consuming of any gas, which can be produced during the battery storage. This support of the hydrogen electrode under anodic (positive) polarity excludes cathodic deposition of metal, which could poison the hydrogen electrode and interfere in the use of the hydrogen electrode.

A gas atmosphere in the common space of the battery vessel is dependent upon the kind of chemistry, and the value of the gas precharge pressure depends upon the rate of the charge-discharge processes.

If Ni—Cd, Ni—Zn, Ni—Fe or Pb—$PbO_2$ chemistries are used in working cells, it is possible to operate without a hydrogen precharge and with very low initial pressure, preferably less than 1 ata, more preferably less than 0.5 ata, more preferably less than 0.2 ata, more preferably less than 0.1 ata, and preferably close to 0 ata. The advantage of low pressure is very fast gas diffusion ($H_2$, $O_2$ and vapor) between the regulator and the working cells. The rate of this exchange can be regulated by means of the value of the initial nitrogen pressure. This value can have a range of 0–1 ata depending upon the rate of the charge-discharge process. If the rate of the charge process is high, it is possible to use less initial nitrogen pressure for providing fast diffusion of oxygen and hydrogen from the working cells to the regulator and water vapor diffusion from the regulator to the working cells. In this case the initial nitrogen pressure should be preferably less than 1 ata, more preferably less than 0.5 ata, more preferably less than 0.2 ata, more preferably less than 0.1 ata, and preferably close to 0 ata. If the discharge rate is high, the battery will heat and undesirable diffusion of water vapor occurs from the working cells to the regulator. The rate of diffusion depends upon the nitrogen pressure. Therefore, it is necessary to have more nitrogen pressure at higher rates of battery discharge. The nitrogen pressure should preferably be close to 1.5 ata, more preferably between 0.5 and 1.5 ata, and even more preferably close to 1 ata.

The above-mentioned considerations point out that the initial nitrogen pressure should be chosen based on the charge-discharge rate and operating temperature.

If Ni—MeH chemistry is used and nickel hydride-hydrogen or nickel hydrogen regulator is used, it is necessary to have constant hydrogen pressure to prevent self-discharge of the metal-hydride electrode, the rate of which is dependent upon external hydrogen pressure. The value of the hydrogen pressure is determined by the type of the metal hydride alloy, operation temperature and so on. It is necessary periodically to discharge metal hydride-hydrogen or charge nickel hydrogen regulators for supporting hydrogen pressure. Hydrogen will be produced electrochemically at the hydrogen electrode according to reverse reactions (6,13).

EXAMPLE PARAMETERS

The present invention takes into consideration the chemistry of different regulator cells. The following parameters are given by example and are not meant to limit the scope of the present invention.

If the metal or metal hydride-hydrogen couple is used as the regulator, the regulator voltage, $V_R$, should preferably be maintained between $V_{OC}+0.05$ V and $V_{OC}+0.7$ V.

For example, as can be seen in FIG. 2, if metal (or metal-hydride) is used and hydrogen couple as the regulator, the rate of hydrogen consumption is too small below this interval and rate of oxygen consumption is too low above this interval. The hydrogen electrode has positive polarity and the metallic or metal-hydride electrode of the regulator has negative polarity regardless of the gas being consumed. The examples given below and Table I illustrate these issues. The magnitudes of OCV are given within an accuracy of 0.05 V.

The Cd—$H_2$ regulator, which has OCV equal to 0.0 V is supported at: $0.05 \text{ V}<V<0.70 \text{ V}$, and the Pb—$H_2$ regulator, which has OCV equal to 0.35 V, is supported at a voltage of: $0.40 \text{ V}<V_R<1.10 \text{ V}$. The polarity of Cd and Pb electrodes is negative and the polarity of the $H_2$ electrode is positive regardless of the gas consumed (hydrogen or oxygen).

If metal-oxide and hydrogen couples are used, the regulator is supported at voltage $V_{OC}-0.7 \text{ V}<V_R<V_{OC}-0.05 \text{ V}$. The rate of hydrogen consumption is too small below this interval and rate of oxygen consumption is too low above this interval (See FIG. 2). The hydrogen electrode has negative polarity and metal-oxide electrode of the regulator has positive polarity regardless of the gas being consumed.

The NiOOH—$H_2$ regulator, which has OCV equal to 1.30 V is supported at: $1.25 \text{ V}<V_R<0.60 \text{ V}$. The PbO$_2$—$H_2$ regulator, with OCV equal to 1.70 V is supported at: $1.0 \text{ V}<V_R<1.65 \text{ V}$. The MnOOH—$H_2$ regulator, which has OCV equal to 1.40 V is supported at: $0.70 \text{ V}<V_R<1.35 \text{ V}$. The polarity of NiOOH, MnOOH and PbO$_2$ electrodes is positive and the $H_2$ electrode is negative regardless of how much hydrogen or oxygen is consumed. Magnitudes of regulator voltage with the type of electrochemical couple are given in the following Table I.

TABLE I

| Couple | OCV | Voltage$_{max}$ | Voltage$_{min}$ | Regulator polarity |
|---|---|---|---|---|
| Cd—$H_2$ | 0.00 | 0.70 | 0.05 | Cd (−)/$H_2$ (+) |
| MeH—$H_2$ | 0.00 | 0.70 | 0.05 | MeH (−)/$H_2$ (+) |
| Zn—$H_2$ | 0.40 | 1.10 | .45 | Zn (−)/$H_2$ (+) |
| Fe—$H_2$ | 0.05 | 0.75 | 0.10 | Fe(−)/$H_2$ (+) |
| Pb—$H_2$ | 0.35 | 1.05 | 0.40 | Pb(−)/$H_2$(+) |
| NiOOH—$H_2$ | 0.30 | 1.25 | 0.60 | NiOOH(+)/$H_2$(−) |
| MnOOH—$H_2$ | 1.40 | 1.35 | 0.70 | MnOOH(+)/$H_2$(−) |
| PbO$_2$—$H_2$ | 1.70 | 1.65 | 1.00 | PbO$_2$(+)/$H_2$(−) |

The foregoing description of the invention is illustrative of the preferred embodiment of the invention currently contemplated by the inventor thereof. However, it should be clear that the foregoing description of the invention is not to be interpreted in a limitative manner, there being several equivalent systems and manners of performing the present invention. For example, the logic of the present invention can be used in very large batteries as well as small batteries (ranging from 10 to 50 watt-hours/liter and 50 to 100 watt-hours/liter) or may be used alone or in combination with a pressure sensor or a temperature sensor to monitor the charge status of the battery without departing from the scope and spirit of the present invention. Hence, the true scope of the invention is only to be defined by the claims appended hereto.

What is claimed is:

1. A sealed rechargeable storage battery comprising:
   a sealed housing;
   at least one rechargeable working cell within said sealed housing;
   positive and negative terminals connected through the sealed housing to respective positive and negative ends of the working cell;
   at least one regulator cell within said sealed housing; a common gas space inside said housing in communication with said rechargeable working cell and said regulator cell;
   said regulator cell having a first electrode and a hydrogen electrode;
   means to make external connection to said hydrogen electrode;
   means to make external connection to said first electrode; and
   a voltage stabilizer connected to said regulator cell capable of maintaining the voltage applied to said regulator cell within a preselected range.

2. A battery according to claim 1, having a plurality of rechargeable working cells; and means for connecting said working cells in electrical relationship with each other.

3. A battery according to claim 2, wherein said electrical relationship is at least one of a series or a parallel relationship.

4. A battery according to claim 1, wherein the regulator cell is a metal-hydrogen cell capable of consuming hydrogen or oxygen gas in said gas space and said preselected range is the range of $V_{OC}+0.05 \text{ V}<V_R<V_{OC}+0.70 \text{ V}$.

5. A battery according to claim 4, wherein the first electrode of said regulator cell is selected from the group consisting of Cd, Zn, Fe, and Pb.

6. A battery according to claim 4, wherein the hydrogen electrode is maintained under positive polarity.

7. A battery according to claim 1, wherein the regulator cell is a metal hydride-hydrogen cell capable of consuming hydrogen or oxygen gas in said gas space and said preselected range is the range of $V_{OC}+0.05 \text{ V}<V_R<V_{OC}+0.70 \text{ V}$.

8. A battery according to claim 7, wherein the hydrogen electrode is maintained under positive polarity.

9. A battery according to claim 1, wherein the regulator cell is a metal oxide-hydrogen cell capable of consuming hydrogen gas in said gas space and said preselected range is the range of $V_{OC}-0.7\ V<V_R<V_{OC}-0.05\ V$.

10. A battery according to claim 9, wherein the first electrode is selected from the group consisting NiOOH, MnOOH, and $PbO_2$.

11. A battery according to claim 9, wherein the hydrogen electrode is maintained under negative polarity.

12. A battery according to claim 1, wherein the gas space is substantially a vacuum.

13. A battery according to claim 1, said gas space having gas at am initial pressure in the range of 0.01–1 ata.

14. A battery according to claim 13, said gas space having gas at an initial nitrogen pressure less than 1.

15. A battery according to claim 14, wherein said hydrogen precharge is supported by means of discharge of a metal hydride-hydrogen regulator or charge of a nickel hydrogen regulator.

16. A battery according to claim 1, wherein the charging of the working cells is capable of being terminated when a predetermined temperature limit is exceeded.

17. A battery according to claim 1, wherein the the voltage of the regulator cell is capable of being maintained within the same range during operation and storage of the battery.

18. A battery according to claim 16, including means for sensing a temperature of said battery wherein said sensed temperature can be used to control the charging and discharging.

19. A battery according to claim 18, wherein said means for sensing temperature is external to said housing.

20. A battery according to claim 1, including a pressure sensor connected to be responsive to the pressure in said common gas space of said sealed housing.

21. A battery according to claim 1, wherein the battery is free from the presence of an internal pressure sensor.

22. A method of operating a sealed rechargeable storage battery having at least one rechargeable working cell, at least one regulator cell in gaseous communication in a gas space with said working cell, and a voltage regulator, said regulator cell having a first electrode and a hydrogen electrode, said electrodes being connected to said voltage regulator, said method comprising the step of:

maintaining a pre-selected voltage range with the voltage regulator.

23. A method according to claim 22 wherein the regulator cell is a metal hydride-hydrogen or metal-hydrogen cell capable of consuming hydrogen or oxygen gas in said gas space and said pre-selected voltage range is the range of $V_{OC}+0.05\ V<V_R<V_{OC}+0.70\ V$.

24. A method according to claim 23, wherein the first electrode of said regulator cell is selected from the group consisting of Cd, Zn, Fe, Pb and metal hydrides.

25. A method according to claim 22, wherein the regulator cell is a metal oxide-hydrogen cell capable of consuming gas in said gas space and said pre-selected voltage range is the range of $V_{OC}-0.7\ V<V_R<V_{OC}-0.05\ V$.

26. A method according to claim 25, wherein the first electrode is selected from the group consisting of NiOOH, MnOOH, and $PbO_2$.

27. A battery according to claim 14, said gas space having gas at an initial nitrogen pressure less than 0.5 ata.

28. A battery according to claim 14, said gas space having gas at an initial nitrogen pressure less than 0.2 ata.

29. A battery according to claim 14, said gas space having gas at an initial nitrogen pressure less than 0.1 ata.

30. A battery according to claim 16, wherein the predetermined temperature limit is 5–10 degrees Celsius over a normal operating temperature for the battery.

* * * * *

UNITED STATES PATENT AND TRADEMARK OFFICE
CERTIFICATE OF CORRECTION

PATENT NO. : 5,569,554
DATED : October 29, 1996
INVENTOR(S) : Tsenter

It is certified that error appears in the above-indentified patent and that said Letters Patent is hereby corrected as shown below:

Column 10, line 48, delete "and vapor" and insert --and $H_2O$ vapor--.

Column 11, line 24, delete "$V_{cc}$-0.7V" and insert --$V_{cc}$+0.7V--

Column 12, line 7, delete "MnOOH-$H_2$" and insert --MnOOH$^-$-$H_2$--.

Column 13, line 4 (Claim 9, line 4), delete "$V_{cc}$-0.05V" and insert --$V_{cc}$-0.05V--;
line 13 (Claim 13, line 2) delete "am" and insert ----an--; and
line 13 (Claim 13, line 2) after "initial" insert --nitrogen--.

Signed and Sealed this

Eleventh Day of February, 1997

Attest:

BRUCE LEHMAN

*Attesting Officer*     *Commissioner of Patents and Trademarks*